United States Patent [19]

Thompson et al.

[11] Patent Number: 4,743,869
[45] Date of Patent: May 10, 1988

[54] CONSTANT RESISTANCE LOSS/SLOPE FILTER CIRCUIT

[75] Inventors: Kenneth A. Thompson, Lockport; Kenneth Hohhof, Glen Ellyn, both of Ill.

[73] Assignee: Rockwell International Corporation, El Segundo, Calif.

[21] Appl. No.: 915,165

[22] Filed: Oct. 3, 1986

[51] Int. Cl.⁴ .............................................. H03H 7/03
[52] U.S. Cl. .................................... 333/28 R; 333/167
[58] Field of Search ..................... 333/28 R, 167, 168; 375/11, 13; 330/304

[56] References Cited

U.S. PATENT DOCUMENTS 3,781,722 12/1973 Pierson ......................... 333/28 R X
4,477,913 10/1984 Koya et al. ................... 333/28 R X Primary Examiner—Paul Gensler
Attorney, Agent, or Firm—C. B. Patti; V. L. Sewell; H. F. Hamann

[57] ABSTRACT

A constant resistance loss/slope filter circuit has a plurality of cascaded circuit sections. Each circuit section has a fixed resistive pad and a slope equalizer. Each circuit section also has a switch for switching inputs and outputs of the circuit sections between the fixed resistive pad and the slope equalizer. Each of the circuit sections has a fixed resistive pad with a different predetermined value loss and a slope equalizer with a different predetermined value of a slope.

6 Claims, 3 Drawing Sheets

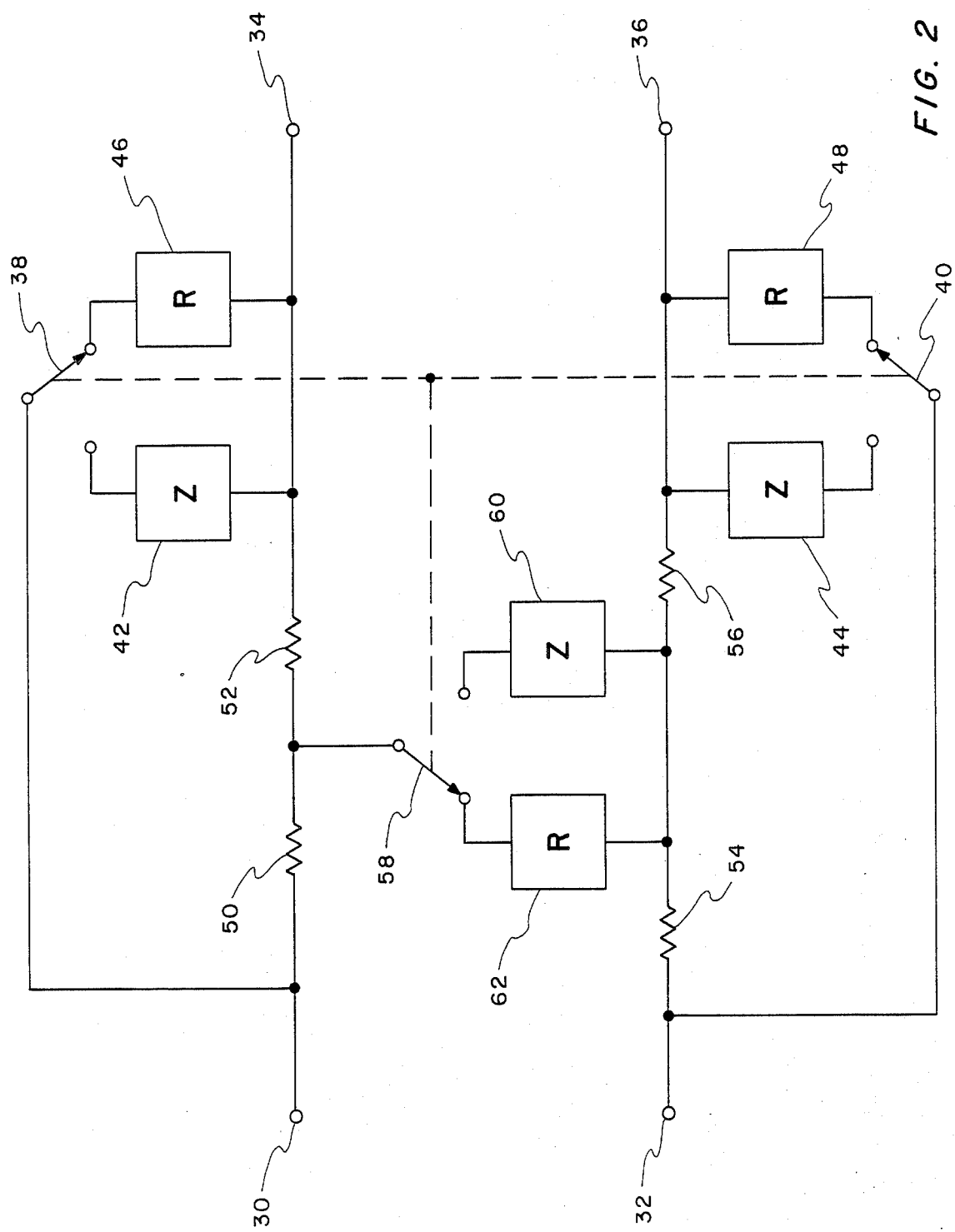

CONSTANT RESISTANCE LOSS/SLOPE FILTER CIRCUIT

BACKGROUND OF THE INVENTION

The present invention relates in general to circuits for pre-equalizing digital transmission lines and, in particular, to circuits utilizing fixed resistive pads and slope equalizers.

Constant Resistance filters are well known in the prior art, and are widely used to pre-equalize digital transmission lines. However, in order to accommodate different cable lengths, a family of slope equalizers has typically been used in the prior art. The electronic device used to pre-equalize the transmission lines was designed to accept a large family of plug-in equalizers.

The present invention overcomes this well known draw-back in the prior art with a single electronic circuit which can switch between various fixed resistive pads and slope equalizers.

OBJECTS OF THE INVENTION

It is a general object of the present invention to provide an electronic circuit which is selectable between a fixed resistive pad and a slope equalizer.

It is a further object of the present invention to provide a electronic circuit which can function as a fixed resistive pad or a slope equalizer.

SUMMARY OF THE INVENTION

The present invention is a constant resistance loss/slope filter circuit which comprises a plurality of cascaded circuit sections. Each of the circuit sections has a fixed resistive pad and a slope equalizer with a switch to select between the fixed resistive pad and the slope equalizer. Each of the fixed resistive pads has a pre-determined value of loss. Each of the slope equalizers has a pre-determined value of slope.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, in the several figures of which like reference numerals identify like elements, and in which:

FIG. 2 is a general schematic drawing of the FIG. 1 block diagram;

DESCRIPTION OF THE PREFERRED EMBODIMENT

Figure 1:
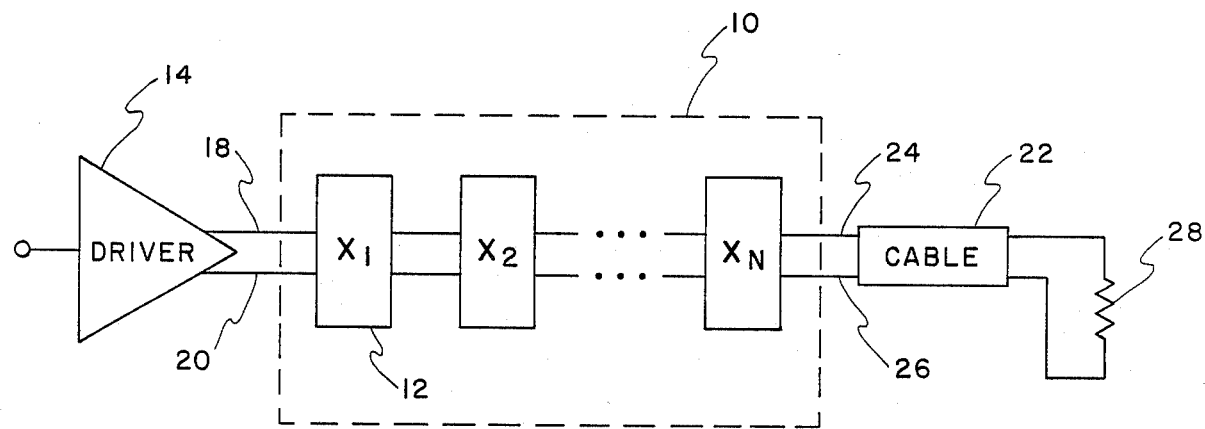
FIG. 1 is a general block diagram of the loss/slope filter circuit.

The novel loss/slope filter circuit of the present invention is utilized to pre-equalize digital transmission lines where the transmission lines have different cable lengths. As shown in FIG. 1, the filter circuit 10 has a plurality of circuit sections 12 cascaded together. A driver 14 sends an electronic signal, which may be in digital or analog form, to the input of the filter circuit 10 over lines 18 and 20. An output of the circuit 10 is connected to a cable 22 on output lines 24 and 26. Cable 22 is terminated in a resistance 28. As will be explained each of the circuit sections 12 in the filter circuit 10 can act as a fixed resistive pad or a slope equalizer to properly pre-equalize the cable 22.

FIG. 2 is a more detailed schematic diagram of one of the circuit sections 12 in the filter circuit 10 shown in FIG. 1. Each circuit section 12 has first and second input terminals 30 and 32 respectively, and first and second output terminals 34 and 36. First and second switches 38 and 40 connect into the circuit section 12 either the first and second impedances 42 and 44 or the first and second resistances 46 and 48 between the first and second input terminals 30 and 32 and the first and second output terminals 34 and 36, respectively. First and second resistors 50 and 52 are connected in series between the first input terminal 30 and the first output terminal 34. Third and fourth resistors 54 and 56 are connected in series between the second input terminal 32 and the second output terminal 36. The switch 58 connects into the circuit either impedance 60 or resistance 62 between the juncture of the first and second resistors 50 and 52, and the juncture of the third and fourth resistors 54 and 56. The first, second, and third switches 38, 40 and 58 are connected such that either the first, second or third impedances 42, 44, and 60 are incorporated in the circuit section 12, or the first, second, and third resistances 46, 48, and 62 are incorporated.

Thus, it can be seen that each circuit section 12 comprises a means for providing a fixed resistive pad and a means for providing a slope equalizer with a means for switching a section input and a section output between the fixed resistive pad and the slope equalizer for changing the component values within the resistance filter to make it act as a fixed resistive pad or a slope equalizer. FIG. 2 shows the circuit section with the switches set for the constant resistance position. Each of the circuit sections 12 have a fixed resistive pad with a different pre-determined value of loss. Also, each of the circuit sections 12 has a slope equalizer with a different pre-determined value of slope. Therefore, when a plurality of circuit sections 12 are cascaded a variety of different combinations of fixed resistive pad settings and equalized slope settings are possible.

Figure 3:
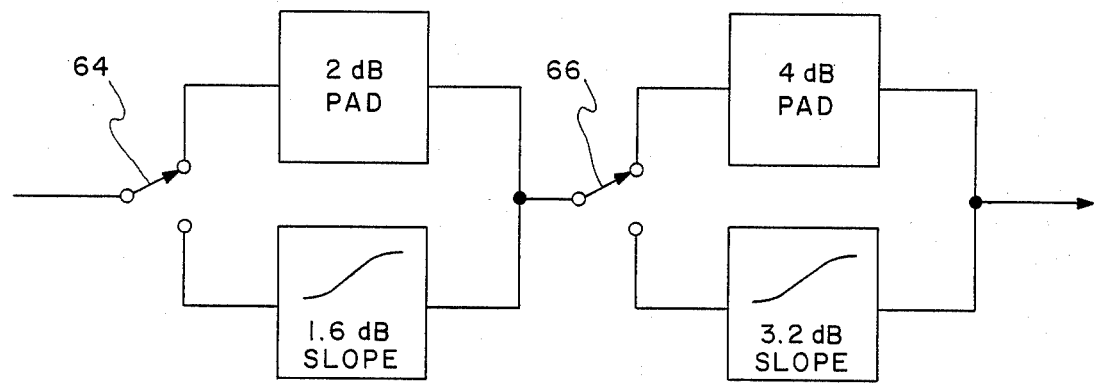
FIG. 3 is a block diagram of a preferred embodiment of the loss/slope filter circuit having two circuits cascaded together.

FIG. 3 schematically shows a two-stage loss/slope filter circuit illustrating that switches 64 and 66 can be set so that the filter circuit becomes a 2 db loss resistance pad in series with a 4 db loss resistance pad.

If switch 64 is changed to its alternate position and switch 66 remains in its original position, the filter circuit becomes an equalizer, with a first stage having a slope of 1.6 db in series with the second stage a 4 db loss resistance pad.

If switch 64 remains in its original position and switch 66 is changed to its alternate position, the filter circuit becomes a slope equalizer, with a first stage a 2 db loss resistance pad in series with a second stage equalizer having a slope of 3.2 db.

If switches 64 and 66 are changed to their other position the filter circuit becomes an equalizer, with a first stage having a slope of 1.6 db and the second stage having a slope of 3.2 db.

Figure 4:
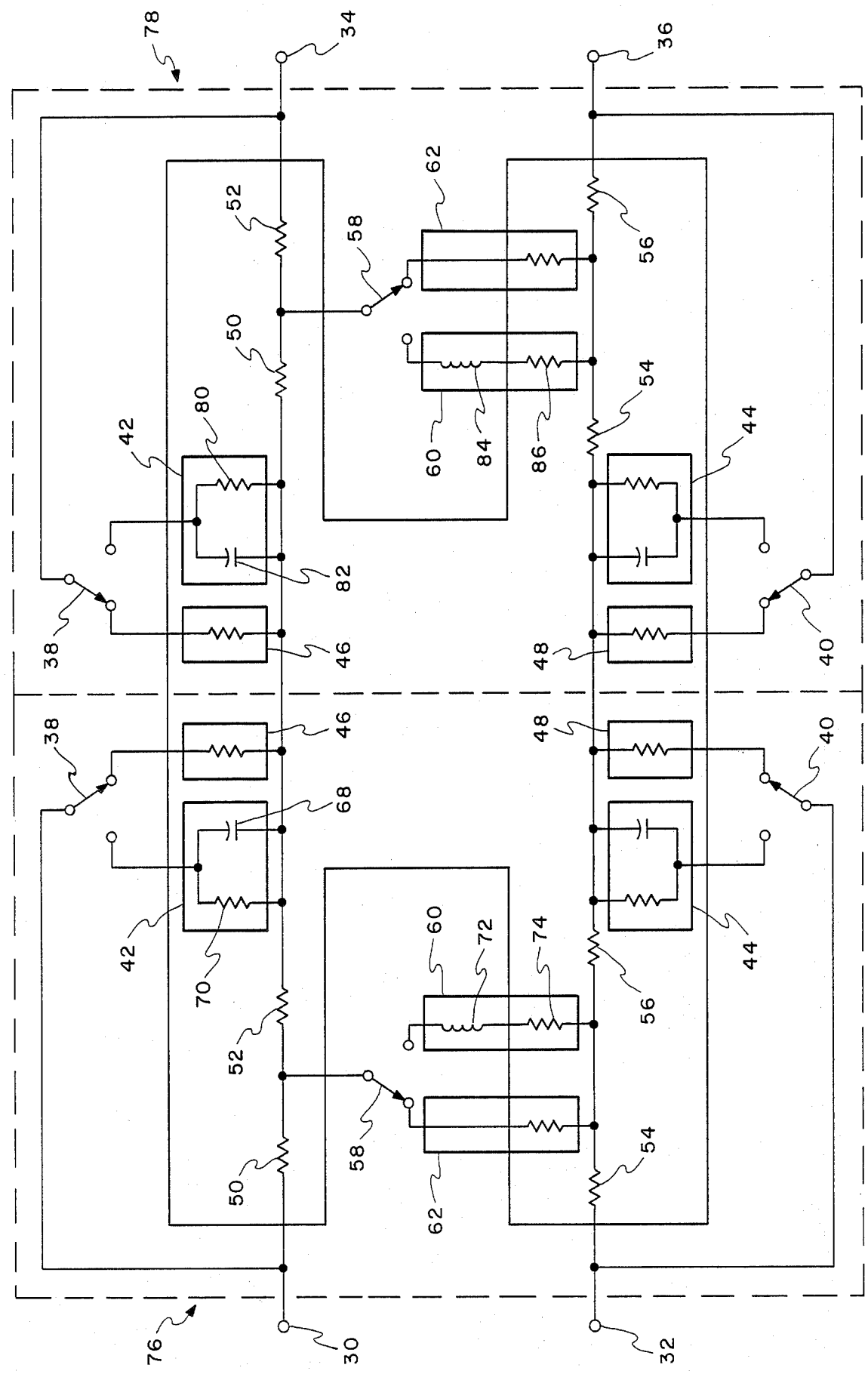
FIG. 4 is a circuit diagram of a preferred embodiment of the loss/slope filter circuit having two circuit sections cascaded together.

FIG. 4 is a schematic diagram of the preferred embodiment of the present invention and is an implementation of the two stage filter circuit illustrated in FIG. 3.

In this embodiment resistors 50 and 52, 54 and 56 all have a value of 50 ohms. Resistances 46 and 48 have values of 12.946 ohms, and resistance 62 has a value of 386.21 ohms. Impedances 42 and 44 are a capacitor 68 in parallel with a resistor 70. The capacitor has a value of 13,600 picofarads and the resistor has a value of 10.113 ohms. The impedance 60 is an inductor 72 in series with a resistor 74. The inductor 72 has a value of 68 microhenrys and the resistor 74 has a value of 494.4 ohms. The values given above for the resistances 46, 48 and 62 and the impedances 42, 44 and 60 are for the first circuit section 76 shown in FIG. 4.

In the second circuit section 78, the resistances 46 and 48 have values of 29.245 ohms, and resistance 62 has a value of 170.97 ohms. Impedances 42 and 44 have a resistor 80 having a value of 22.272 ohms in parallel with a capacitor 82 having a value of 6,600 picofarads. The third impedance 60 has an inductor 84 with a value of 33 microhenrys and a resistor 86 has a vlue of 224.5 ohms. The resistors 50, 52, 54, and 56 in the second circuit section 78 have a value of 50 ohms.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A loss/slope filter circuit comprising:
    a plurality of cascaded circuit sections having a circuit input and a circuit output, each of said circuit sections having;
        means for providing a fixed resistive pad;
        means for providing a slope equalizer;
        means for switching a section input and a section output between said fixed resistive pad means and said slope equalizer means;
    each of said means for providing a fixed resistive pad having a different predetermined value of loss and each of said means for providing a slope equalizer having a different predetermined value of slope.

2. A constant resistance loss/slope filter circuit having at least one circuit section comprising:
    first and second input terminals;
    first and second output terminals;
    first means for switching connecting a first means for providing an impedance between said first input terminal and said first output terminal for one switch position, and connecting a first means for providing a resistance between said first input terminal and said first output terminal for another switch position;
    second means for switching connecting a second means for providing an impedance between said second input terminal and said second output terminal for one switch position, and connecting a second means for providing a resistance between said second input terminal and said second output terminal for another switch position;
    first and second resistors connected in series between said first input terminal and said first output terminal;
    third and fourth resistors connected in series between said second input terminal and second output terminal;
    third means for switching connecting a third means for providing an impedance between a juncture of said first and second resistors and a juncture of said third and fourth resistors for one switch position, and connecting a third means for providing a resistance between said juncture of said first and second resistors and a juncture of said third and fourth resistors for another switch position;
    said first, second and third switching means being connected to each other such that said first, second and third impedance means are incorporated in the circuit for said one switch position and said first, second and third resistance means are incorporated in the circuit section for said another switch position.

3. The circuit described in claim 2 wherein said loss/-slope filter circuit comprises a plurality of cascaded circuit sections.

4. The circuit described in claim 3 wherein each of said circuit sections has a different predetermined value of loss and a different predetermined value of slope.

5. The circuit described in claim 2 wherein each of said first, second and third resistance means is a resistor.

6. The circuit described in claim 2 wherein each of said first and second impedance means is a capacitor in parallel with a resistor and said third impedance means is an inductor in series with a resistor.

* * * * *